United States Patent Office 3,487,814
Patented Jan. 6, 1970

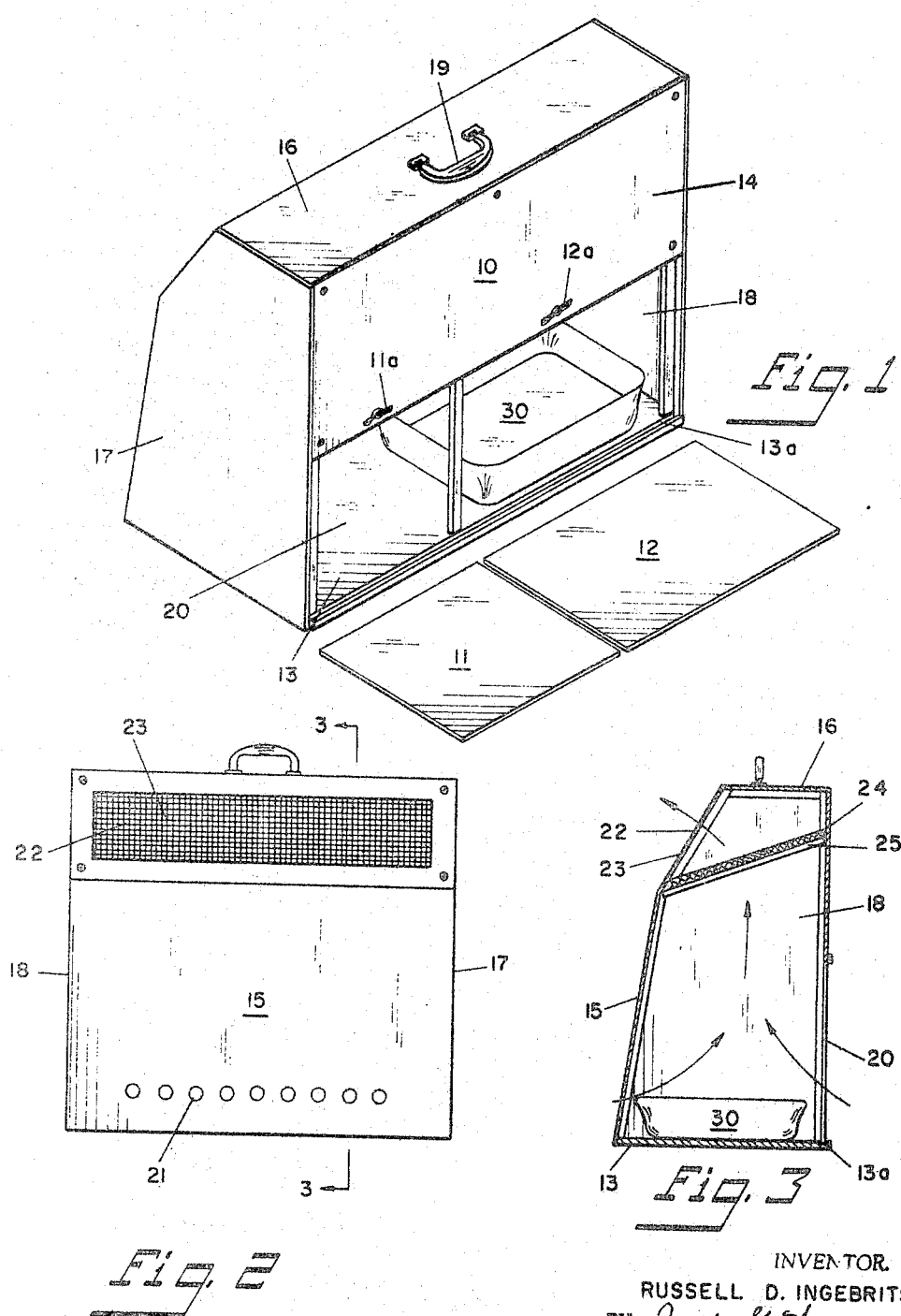

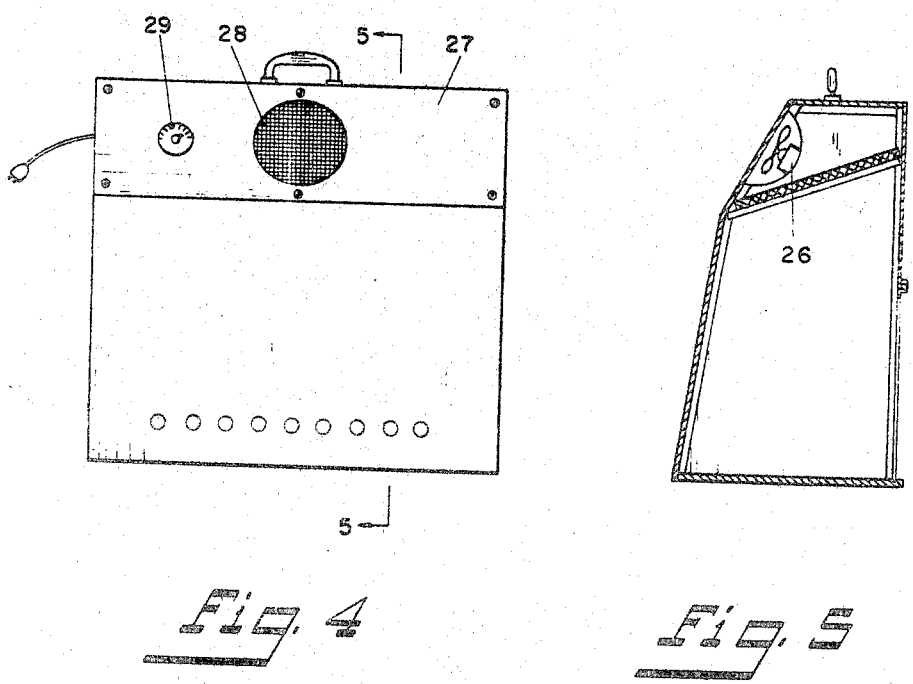

3,487,814
PORTABLE VENTILATED PET STATION
Russell L. Ingebritsen, 1321 Superior Ave.,
Tomah, Wis. 54660
Filed Oct. 30, 1967, Ser. No. 678,860
Int. Cl. A01k 1/02
U.S. Cl. 119—19    1 Claim

ABSTRACT OF THE DISCLOSURE

A portable, rigid box-like pet enclosure having a charcoal filter in the upper portion thereof for absorbing the animal odors. Ventilation is provided by either natural connective air currents passing in through ports in the backwall and the entrance in the front wall and then upwardly through a ventilation opening above the filter. A fan may provide forced circulation for a desired period in response to a manually set timer.

BACKGROUND OF THE INVENTION

Field of the invention

This invention relates generally to animal enclosures and more particularly to a portable pet station with an odor control filter.

Description of the prior art

There are several portable pet houses presently known for shipping and carrying small pets such as cats, dogs and the like. U.S. Patents Nos. 3,035,544 and 2,790,414 disclose two of such houses. Other enclosures such as the one described in U.S. Patent No. 2,470,223, incorporate additional features making them suitable for displaying the animals. However, these known enclosures make no provision for controlling odors emanating from the animals or their droppings and, therefore, they are not generally suitable for extended use in a confined area such as a room or automobile.

SUMMARY OF THE INVENTION

In general, my invention comprises a portable pet station having an odor abseorbing filter such as a charcoal filter positioned between ventilation openings near the bottom and top of the enclosure providing an upward circulation pattern through the filter to eliminate objectionable animal odors.

A front entry is provided in the enclosure to permit access to the interior. Two removably attached panels are provided to close the entry. Preferably, one panel is larger than the other and serves to enclose a litter pan set on the floor of the enclosure. The smaller door provides access to the remaining floor area. When the enclosure is to be kept at one place for any length of time, as in a home or a motel room, the smaller panel may be removed, permitting domesticated pets free enry and exit to and from the enclosure and providing the pet access to the litter pan. The larger panel may be removed to facilitate removal and cleaning of the litter pan as required.

Ventilation may be accomplished through natural convective air currents or through a fan placed in the top of the enclosure. Where a fan is used, timer may also be provided for periodic forced ventilation.

The primary object of my invention is to provide a portable odor free pet station which is not only suitable for extending use as an indoor pet station but also for transporting pets in automobiles or other vehicles.

Further objects, features and advantages of my invention will be apparent from the following detailed description taken in conjunction with the accompanying drawings showing several embodiments exemplifying the principles of my invention.

BRIEF DESCRIPTION OF THE DRAWINGS

FIGURE 1 is a perspective view of my invention showing the odor absorbing filter in phantom.

FIGURE 2 is an elevation view of the back of my portable pet station.

FIGURE 3 is a cross-sectional view taken along section line 3—3 of FIGURE 2.

FIGURE 4 is an elevation view of the back of a second embodiment of my invention having a fan to induce circulation.

FIGURE 5 is a cross-sectional view taken along section line 5—5 of FIGURE 4.

DESCRIPTION OF THE PREFERRED EMBODIMENTS

Referring now more particularly to the drawings wherein like numerals refer to like parts throughout the several views, my portable, ventilated pet station is shown generally at 10 in FIGURE 1 wherein the station is set up for use with the entrance panel 11 and cleaning panel 12 removed.

Looking now also to FIGURES 2 and 3, my novel pet station consists basically of a box-like enclosure having a floor 13, a front wall 14, a back wall 15, a top 16 and side walls 17 and 18. The lower half of the front of the enclosure comprises two removably attachable panels, entrance panel 11 and cleaning panel 12. The panels are adapted to be set in groove 13a in the floor and secured by pivotal fasteners such as 11a and 12a. The top has a typical luggage handle 19 secured thereto for carrying the pet station.

As shown by the arrows in FIGURE 3, an up-flow ventilation pattern is provided for air entering the enclosure through the front entrance 20 and through rear ventilation openings 21 in the back wall 15. The rising air passes out an upper ventilation opening 22 disposed diagonally between the back wall 15 and the top 16. The upper ventilation opening 22 has a screen unit 23 extending thereacross while the lower rear ventilation holes 21 are merely drilled through the back wall of the enclosure near the floor. Additional ventilation is provided, of course, when either or both of panels 11 and 12 are removed.

An impotant feature of my invention is the elimination of pet odors provided by a screen type odor absorbing filter 24 positioned in the top portion of the enclosure above the front entrance 20.

The filter 24 contains highly absorbent carbon, commonly called "activated charcoal." Such filters are generally available commercially and consist of a supporting frame with meshwork or screening enclosing a supply of actviated charcoal. The filter is sufficiently porous to permit the free passage of air therethrough for absorbing and filtering out odors. The generally rectangular filter bridges the entire top of the enclosure, resting on support members 25 affixed to the side walls of the enclosure.

The activated charcoal filter should remain effective for a long period of use, however, when necessary the filter may be easily removed by unscrewing either the front wall 14 or the screen unit 23 and then sliding the filter out on its support members.

In the second embodiment of my invention shown in FIGURES 4 and 5, low-speed fan 26 is provided for forced air circulation. The fan is mounted on a rectangular sheet metal unit 27 which extends across the top ventilation opening 22. Unit 27 has a screened circular opening 28 through which the fan forces air.

This second embodiment also has a small timer 29 mounted on the rectangular sheet metal unit 27. The timer can be manually set to provide a period of preselected duration for the operation of the circulating fan 26. By setting the timer, one can thus provide forced circulation for any desired time and the timer will then automatically shut off the fan.

The box-like enclosure is preferably constructed of wood, but may, of course, be made of any number of materials, including for example, plastic or metal. Plywood paneling is particularly suitable since it is contemplated that the pet station may be used on a relatively permanent basis in the home when it is not being used to transport the animal housed therein. When animals are transported to shows or the like, such a unit provides an attractive travel case.

The front wall 14 of the station may be made of the same material used in constructing the rest of the walls, however, it is preferred that it be made of a rigid, translucent sheet material, such as plexiglass, to permit light to enter the station when the entrance and cleaning panels are in place.

While my pet station 10 is substantially rectangular, the back wall 15 is purposely made to slope forward somewhat as best seen in FIGURES 3 and 5. This particular disposition of the back wall has been found desirable in that it permits the pet station to be placed on the rear floor of an automobile with the sloping back wall conforming generally to the angle of the back of the front seat.

My pet station serves as a very convenient bed for small animals and, particularly with cats, can hold a litter box such as shown at 30 in FIGURE 1. The large entrance provides easy access to the interior for cleaning the station and attending to the animal housed therein. The entrance panel 11 and cleaning panel 12 may be left off continuously when the station is used to house domesticated pets.

It is understood that my invention is not confined to the particular construction and arrangement of parts herein illustrated and described, but embraces all such modified forms thereof as come within the scope of the disclosure.

I claim:
1. A portable pet station comprising:
 (a) a rigid box-like enclosure having bottom, top, front, back and a pair of side walls, said back wall having a portion forwardly disposed from the bottom and a slanting portion removably positioned between the top wall and said forwardly disposed portion,
 (b) said enclosure having upper perforate ventilation opening means disposed in said removable slanting back wall portion,
 (c) said top wall having a handle means secured therewith,
 (d) said enclosure having opening means in the lower portion of one of said walls,
 (e) said enclosure having removable sealing door means in other lower portion of one of said walls for positioning and maintaining an animal therein, and
 (f) an odor absorbing filter positioned within the enclosure and spaced below said upper ventilation opening means whereby air may circulate within the enclosure in through said opening means in one of said walls through said filter and out through said ventilation opening means.

References Cited

UNITED STATES PATENTS

| 2,079,458 | 5/1937 | Leichtfuss. | |
| 2,470,223 | 5/1949 | Powells | 119—19 |
| 2,534,492 | 12/1950 | Williams | 119—19 |
| 3,029,790 | 4/1962 | Loudon | 119—51.11 |
| 3,237,599 | 3/1966 | Torrey et al. | 119—19 |

HUGH R. CHAMBLEE, Primary Examiner